July 23, 1940.                K. E. PEILER                2,209,018
                GLASS CHARGE DELIVERY APPARATUS AND METHOD
                         Filed July 30, 1937
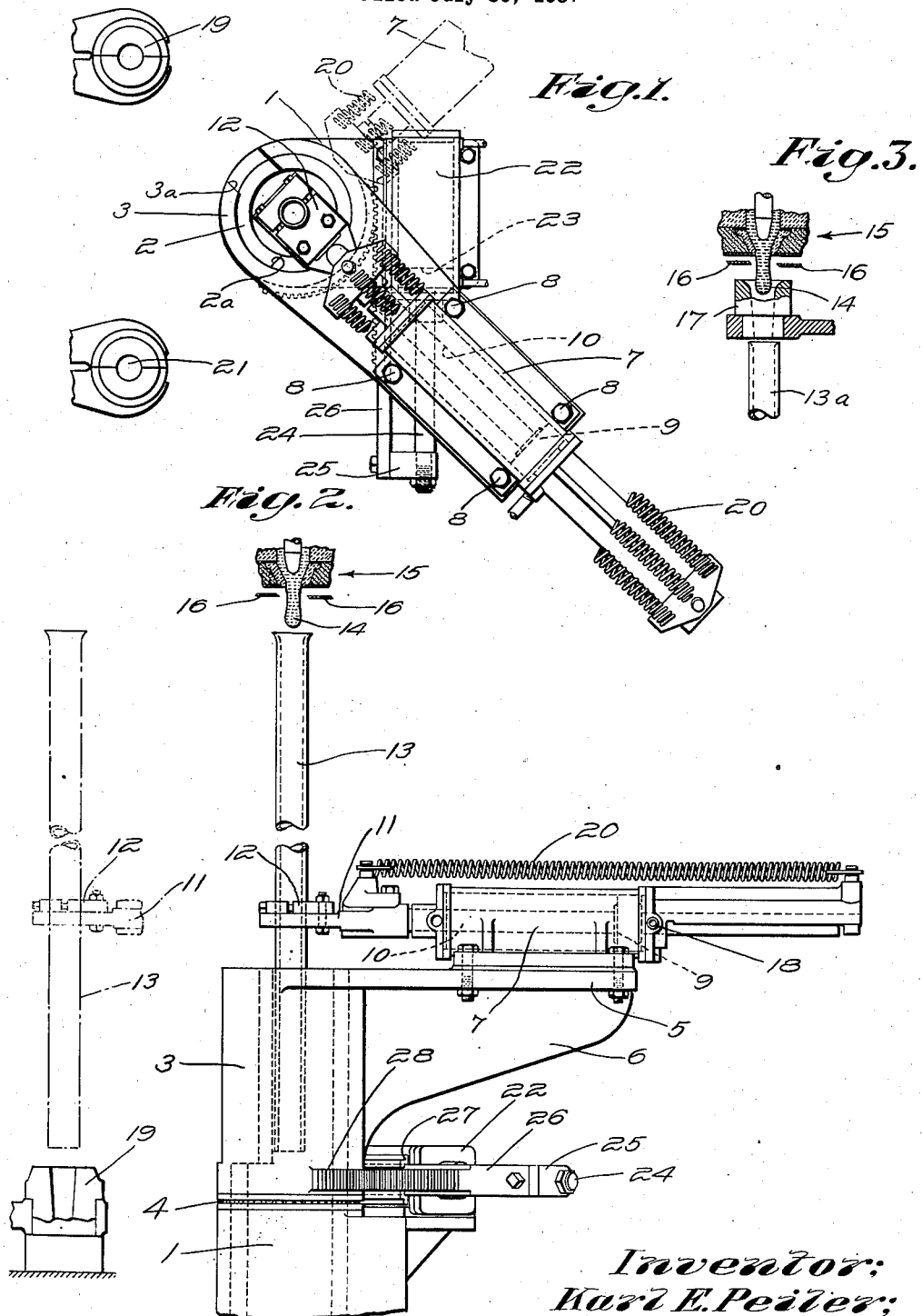
Inventor:
Karl E. Peiler,
by Brown + Parham
Attorneys
Witness:
W. B. Thayer Patented July 23, 1940

2,209,018

UNITED STATES PATENT OFFICE 2,209,018

GLASS CHARGE DELIVERY APPARATUS AND METHOD

Karl E. Peiler, West Hartford, Conn., assignor to Hartford-Empire Company, Hartford, Conn., a corporation of Delaware Application July 30, 1937, Serial No. 156,437

5 Claims. (Cl. 49—55)

This invention relates to improvements in apparatus for and methods of delivering charges of molten glass from a feeder to the molds of associate glassware forming machinery.

The molds of a glassware forming machine or machines to which the glass charges produced by a feeder are to be delivered often are located below and out of vertical alignment with the charges as they are produced by the feeder. The charges therefore must be given a movement having a horizontal component as they fall or are conducted downwardly from the feeder to the molds for which they are intended.

It is desirable that each charge should fall or be delivered vertically downward into the cavity of the mold centrally of the latter and with the longitudinal axis of the charge aligned with the longitudinal center line or axis of the mold cavity so that the first chilling contact of the glass of the charge with the walls of the mold cavity will be substantially uniform throughout the surface area of the charge and will commence at approximately the same instant at all points of contact between the glass charge and the walls of the mold. It also is desirable that the charge, which, as produced by the feeder, has been given a shape best suited for the mold cavity, should be delivered to the mold while such charge retains as nearly as possible that same shape. The charge also should be delivered to the mold with a minimum of differential chilling of different portions of the surface of the charge.

Inclined chutes or troughs usually are employed to deliver to the molds charges produced by a feeder located as above described with respect to the molds. While such chutes or troughs serve the purpose of delivering to the molds charges which can be formed into articles of glassware that will satisfy commercial requirements, the structure and necessary mode of operation of these chutes or troughs oppose the attainment of the above stated desirable results and may make more difficult or prolonged the operations necessary to manufacture the delivered charges into satisfactory articles of glassware.

An object of the invention is to provide a charge delivery apparatus which will afford facilities for receiving each of successively produced preshaped charges as such charge falls vertically from a feeder with the axis of the charge substantially vertical and for imparting to such charge while it remains vertical a lateral or horizontal movement sufficient to cause the charge to fall axially into a laterally offset mold cavity centrally of the latter.

A further object of the invention is to provide an apparatus which will deliver a charge to a laterally offset mold at a lower level in the manner described with a minimum of differential between the chilled skin at different points on the surface of the charge, without substantial distortion or change of shape of the charge and without appreciably retarding the rate of vertical movement of the falling charge.

A still further object of the invention is to provide a charge delivery apparatus of the character described which will be operable to deliver the charges produced by a feeder to laterally offset molds at different delivery stations, selectively or in turn, or to different or successively presented molds at any selected one of such delivery stations.

Other objects and advantages of the invention will hereinafter be pointed out or will become apparent from the following description of a specific embodiment of the invention, as disclosed in the accompanying drawing, in which:

Figure 1 is a plan view showing two molds at different horizontally spaced delivery stations and a delivery apparatus of the invention in a position as shown by the full lines at which a charge may be received thereby for delivery to one of such molds, the dot-and-dash lines indicating a fragmentary portion of the apparatus when the latter is in position to receive a charge for delivery to the other mold;

Fig. 2 is a side elevation, with parts shown in vertical section, showing a fragmentary portion of a feeder, the charge delivery apparatus at a lower level with its charge delivery tube shown in full lines in alignment with the feeder outlet, and a mold at a laterally offset delivery station, the view also showing in dot-and-dash lines the delivery tube in the position to which it is moved for delivery of a charge to the underlying mold, and Fig. 3 is a fragmentary view similar to a portion of Fig. 2, but showing a separate charge directing funnel between the upper end of the charge delivery tube and the aligned feeder outlet.

In carrying out the invention, I may provide a base structure 1 which supports an upstanding tubular supporting member or bearing 2. A vertically disposed sleeve 3 is rotatably mounted on the bearing 2, preferably being supported thereon anti-frictionally, as at 4, Fig. 2. The sleeve 3 carries a laterally extending supporting arm 5. This arm may be formed integrally with the sleeve 3 and braced or strengthened by an integral web connection 6 with the sleeve, as shown in Fig. 2, or it might be a separate bracket or other arm secured to the sleeve in any suitable known way.

A horizontally disposed pneumatic cylinder 7 is supported on the arm 5 and may be secured firmly in place thereon, as by the fastening devices 8. A piston 9 in the cylinder 7 has a rod 10 projecting from the inner end of the cylinder. The piston rod 10 has a head 11 at its outer end. This head is provided with a clamping device 12 for gripping and firmly supporting a vertically disposed charge guiding tube 13. The arrangements preferably are such that the tube 13 will be located in concentric or axially aligned relation with the rotatably mounted sleeve 3 when the piston 9 is at the end of its stroke nearest to the outer end of the cylinder 7, as shown in Fig. 1 and in full lines in Fig. 2. In order to permit this disposition of the tube 13 when the lower end thereof depends below the upper end of the sleeve 3, the latter and its bearing member 2 may be partially cut away or slotted vertically from their upper ends to a level below the lower end of the tube 13, as indicated at 3a and 2a respectively. The vertical space or slot 2a in the bearing member 2 is of sufficient angular extent to permit movement of the tube 13 horizontally through the space or slot 3a in the sleeve 3 and the space or slot 2a in the bearing member 2 to and from the center of the latter when the sleeve 3 is at any one of a plurality of angularly adjusted positions with respect to the bearing member 2. The purpose and advantage of this arrangement will hereinafter be further explained.

The structure that has been described so far is of such a character and so arranged that the tube 13 will be located directly below and in axial alignment with each of successive glass charges, represented by the attached charge 14 in Fig. 2, at a charge feeding or supply station when the tube is in concentric relation or axially aligned with the sleeve 3, as shown in the drawing. This may be termed the charge receiving or retracted position of the tube 13. These charges may be produced by a feeder having a charge feeding outlet in its bottom, as represented by the fragmentary structure indicated at 15 in Fig. 2. In this event, shears, represented by the blades 16 may be provided and operated to sever each charge from the supply body of molten glass at the feeder outlet when such charge has attained the desired size and shape. Instead of employing an outlet feeder, which does not per se form part of the present invention, any other suitable means, such as the cup of a suction cup feeder, may be employed to supply a series of preshaped charges of suitable weight at the charge supply station above the upper end of the retracted tube 13.

I prefer to have the upper end of the tube 13 as close to the charge 14 as is practicable, so that when the charge starts to drop it will not have too great an initial velocity before it enters the tube. This will permit the tube to begin to move the charge laterally before the charge has acquired too great a downward velocity, and will permit the use of a shorter tube than would be the case if the charge had acquired a higher initial velocity by the time it enters the tube. In the case of a suspended charge feeder, it might be possible to have the charge actually suspended in the upper end of the tube, provided a proper time cycle is observed for the various events. The upper end of the tube 13 may be flared or funneled out, as shown in Fig. 2, as a precaution to guide the charge safely into the tube.

If it is desired, however, a separate funnel 17 may be provided to direct the charge centrally into the tube. A structure of this description is shown in Fig. 3 in which the tube is designated 13a. This funnel 17 may be stationary. It should also be placed as high up as possible and the upper end of the tube 13a should come as close to it as convenient for the same reasons above explained; namely, to have the initial velocity of the charge, as it enters the tube, as low as it can be.

Movement of the piston 9 in the cylinder 7 from the position shown in the drawing will move the tube 13 horizontally from its charge receiving or retracted position. Such movement of the piston may be effected by the application of air under pressure to the rear end portion of the cylinder, as through the pipe connection 18. Any suitable timing means and pneumatic mechanism may be employed to apply air under pressure to and exhaust it from the rear end of the cylinder at the proper times. Also, any suitable adjustable stop mechanism may be employed to predetermine the limits of the strokes of the piston 9 so that the charge receiving or retracted position of the tube 13 will be as above described and so that the charge delivery or projected position of the tube 13 will be directly above and in axial alignment with a mold 19 at a charge delivery station. The movement of the tube 13 to its charge delivery position is sufficiently rapid to assure alignment of the tube with the mold to be charged before the falling charge, which entered the tube while the latter was in its retracted position, has fallen below the lower end of the tube or at least before such charge has passed below a level at which the tube would no longer be effective to control and direct its descent.

The charge falling from the tube thus may descend axially into the cavity of the mold 19 centrally of the latter.

The bore of the tube preferably is only slightly larger in diameter than the falling charge. The laterally confined air in the tube therefore will offer resistance to the otherwise freely falling charge in the tube and thus will serve to prolong the time required for the charge to fall by gravity through the tube. This is of advantage in that with a tube of a given length time is afforded for the required lateral movement of the tube from its charge receiving to its charge delivering position before the charge has fallen to a level at which the tube would no longer be effective to control and direct the descent of the charge.

The return movement of the tube 13 after the delivery of the charge may be effected by a retractile spring mechanism, indicated at 20, which will be effective to accomplish this result when the air pressure in the rear end portion of the cylinder has been relieved. Suitably timed application of air under pressure to the front end of the cylinder 7 might be utilized to accomplish this result, in which event the front end portion of the cylinder would be provided with suitable air pressure and air exhausting or pressure relieving connections. In lieu of the specific piston operating mechanism that has been described, any other suitable known piston operating mechanism may be employed or in fact any suitable known operating mechanism may be employed to effect regulably timed suitable reciprocatory movements of the vertical tube 13 between its charge receiving and charge delivery positions. The required movements of the tube 13 might even be effected by manual action, although automatic mechanism would be required for successful commercial operation.

The sleeve 3 may be turned angularly about the axis of its bearing member 2 and about the axis of the tube 13 when the latter is in retracted position to adapt the apparatus for use to deliver charges to molds at other stations than that at which the mold 19 is located. It is for this reason that the space or slot 2a in the bearing member 2 is of considerably greater width or angular extent than the corresponding space or slot 3a in the sleeve 3.

For example, the charges may be delivered to a mold or different successively presented molds at the station at which a mold 21 is shown in Fig. 1.

The angular turning movement of the sleeve 3 might be effected by manual action but I prefer to provide operating mechanism which is operable to adjust the sleeve 3 to adapt the delivery apparatus to deliver charges to molds at either of spaced delivery stations or to oscillate the sleeve 3 and the parts supported thereby in cyclic movements so as to deliver alternate charges to molds at the different stations.

Such operating mechanism may comprise a cylinder 22 which is mounted on the base 1 and is provided with a piston 23 and a piston rod 24. The latter is connected by a cross head 25 with a rack bar 26 which is suitably guided, as at 27, Fig. 2, so that the teeth of the rack bar mesh with the teeth of a gear or pinion sector 28 on the sleeve 3.

When the piston 23 is at one end of its stroke, as shown in Fig. 1, the delivery apparatus will be adapted for the delivery of a charge to the mold 19. Movement of the piston 23 to the end of a stroke toward the opposite end of the cylinder will swing the sleeve 3 and the mechanism carried thereby about the axis of the sleeve to the position required to adapt the apparatus to deliver the next charge to the mold 21 at a different station.

It will be understood that suitable adjustable stops may be provided to predetermine the limits of the strokes of the piston according to the locations of and distance between the respective charge delivery stations. Also, the mechanism for operating the piston 23 may be of any suitable known structure and mode of operation and may be of such character as to permit such piston to be held stationary at either end of its stroke, so that all the charges may be delivered at the same station or to cause timed reciprocations of the piston so that alternate charges will be delivered at the respective stations.

The tube 13a of the modified form of structure of Fig. 3 may, of course, be supported and operated in the same manner as the tube 13.

The invention is not to be limited beyond the scope indicated by the terms of the appended claims.

I claim:

1. Glass charge delivery apparatus comprising a substantially horizontal cylinder, a piston reciprocable therein, a piston rod carried by the piston, a substantially vertical tube adapted for the passage of a charge of glass therethrough and supported by said piston rod so that said tube will be located at a charge receiving station when the piston is at one end of its stroke in the cylinder and will be moved laterally to a charge delivery position when the piston is moved in said cylinder to the opposite end of its stroke, and means for swinging said cylinder, piston and piston rod as a unit angularly about the axis of said vertical tube when the latter is at said charge receiving station so that the subsequent stroke of said piston will move said vertical tube laterally to a different charge delivery station.

2. Glass charge delivery apparatus comprising an upstanding tubular supporting member, a sleeve mounted on said supporting member, a laterally extending arm carried by said sleeve, a cylinder carried by said arm, the extended axial line of said cylinder intersecting the center line of said sleeve, a piston reciprocable in said cylinder and having a rod extending from said cylinder toward the center line of said sleeve, a substantially vertical charge delivery tube carried by said rod in position to be disposed at the center of said upstanding tubular supporting member when the piston is at the end of its stroke away from said supporting member, said sleeve and said upstanding tubular supporting member having portions of their side walls cut away to permit lateral bodily movement of said vertical charge delivery tube radially outward from said supporting member and sleeve when the piston moves on its stroke toward said sleeve, means located above said charge delivery tube when it is at the center of said sleeve for directing a falling charge of glass downwardly into said tube, and a mold located in position to receive the falling charge from said tube when said tube has been moved radially outward from said sleeve by said stroke of said piston.

3. Glass charge delivery apparatus comprising an upstanding bearing, a sleeve rotatably mounted thereon, a lateral arm on said sleeve, a cylinder carried by said arm, a piston reciprocable in said cylinder and having a piston rod extending toward the extended axial line of said sleeve, a substantially vertical charge delivery tube carried by said rod in position to be axially aligned with said sleeve and at a charge receiving station when said piston is at one end of its stroke in the cylinder and to be located out of alignment with said sleeve and at a charge delivery station when said piston has been moved to the opposite end of its stroke, and means for swinging said sleeve and the parts carried thereby angularly about the axis of said sleeve when the charge delivery tube is at said charge receiving station so that the subsequent stroke of said piston will move said tube laterally to a different charge delivery station.

4. Glass charge delivery apparatus comprising an upstanding tubular bearing, a sleeve rotatably mounted thereon, a lateral arm on said sleeve, a cylinder carried by said arm, a piston reciprocable in said cylinder and having a piston rod extending toward the extended axial line of said sleeve, a substantially vertical charge delivery tube carried by said rod in position to be axially aligned with said sleeve and at a charge receiving station when said piston is at one end of its stroke in the cylinder and to be loacted out of alignment with said sleeve and at a charge delivery station when said piston has been moved to the opposite end of its stroke, and means for swinging said sleeve and the parts carried thereby angularly about the axis of said sleeve when the charge delivery tube is at said charge receiving station so that the subsequent stroke of said piston will move said tube laterally to a different charge delivery station, said tubular bearing and said sleeve having portions of their walls cut away to permit said movements of said charge delivery tube when the lower end of the latter depends below the level of the upper ends of said bearing and said sleeve.

5. The method of delivering a charge of molten glass to a stationary mold which is laterally offset from and below a charge receiving station at which a charge will start to fall vertically while its longitudinal axis is substantially vertical, comprising the steps of maintaining the axis of the charge substantially vertical while permitting the fall of the charge to continue, and, during such fall of the charge, imparting a lateral movement thereto of sufficient extent to dispose said charge directly over and in axial alignment with the cavity of said mold and stopping the lateral movement of the charge at that place before said charge has fallen to the level of the upper end of said mold cavity, and directing the falling charge axially downward into the cavity of the mold centrally of the latter.

KARL E. PEILER.